(12) United States Patent
Guest et al.

(10) Patent No.: US 11,895,119 B2
(45) Date of Patent: Feb. 6, 2024

(54) SYSTEMS, METHODS, AND APPARATUSES FOR PRE-CONFIGURED PER-TENANT ISOLATION IN A MULTI-TENANT CLOUD BASED COMPUTING ENVIRONMENT

(71) Applicant: Salesforce, Inc., San Francisco, CA (US)

(72) Inventors: Ryan Guest, San Francisco, CA (US); Theresa Vietvu, San Francisco, CA (US); Bradley Vine, San Francisco, CA (US); Sean Gill, San Francisco, CA (US); Ricardo Vazquez Reyes, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 474 days.

(21) Appl. No.: 17/163,549

(22) Filed: Jan. 31, 2021

(65) Prior Publication Data

US 2022/0247755 A1 Aug. 4, 2022

(51) Int. Cl.
*H04L 9/40* (2022.01)
(52) U.S. Cl.
CPC .......... *H04L 63/104* (2013.01); *H04L 63/107* (2013.01)
(58) Field of Classification Search
CPC ...... H04L 63/104; H04L 63/107; H04L 63/20
See application file for complete search history.

(56) References Cited

U.S. PATENT DOCUMENTS

| | | | |
|---|---|---|---|
| 9,990,184 B2 * | 6/2018 | Shukla | G06F 8/24 |
| 10,083,317 B2 * | 9/2018 | Pleau | H04L 63/0884 |
| 10,212,053 B2 * | 2/2019 | Vasudevan | H04L 41/5054 |
| 10,380,369 B1 * | 8/2019 | Noe | H04L 63/104 |

(Continued)

OTHER PUBLICATIONS

A. Behl and K. Behl, "An analysis of cloud computing security issues," 2012 World Congress on Information and Communication Technologies, Trivandrum, India, 2012, pp. 109-114, doi: 10.1109/WICT.2012.6409059. (Year: 2012).*

(Continued)

*Primary Examiner* — Jung W Kim
*Assistant Examiner* — Sameera Wickramasuriya
(74) *Attorney, Agent, or Firm* — Polygon IP, LLP

(57) ABSTRACT

An exemplary system having a processor and a memory therein includes means for creating an isolation group, in which creating the isolation groups includes: defining isolation requirements, identifying a group of features utilizing call-out functions, and selecting from among the group of features utilizing call-out functions a group of features having the defined isolation requirements; deploying platform software integrating the isolation requirements, in which the platform software contains instructions to map the isolation requirements to a customer organization; creating the customer organization; creating a unique variant of the customer organization, in which creating the unique variant of the customer organization includes declaratively applying an isolation layer containing isolation requirements on top of a base layer for the customer organization; and deploying the unique variant of the customer organization onto the cus- (Continued)

tomer organization's computing infrastructure, in which the unique variant validates per-tenant distinctions for various applications subjected to the isolation requirements.

21 Claims, 8 Drawing Sheets

(56) References Cited

U.S. PATENT DOCUMENTS

| | | | | |
|---|---|---|---|---|
| 10,848,494 | B2* | 11/2020 | Shelton | H04L 63/107 |
| 2006/0059567 | A1* | 3/2006 | Bird | G06F 12/1466 |
| | | | | 726/28 |
| 2008/0082540 | A1* | 4/2008 | Weissman | G06F 16/289 |
| | | | | 707/999.009 |
| 2008/0086479 | A1* | 4/2008 | Fry | G06F 16/27 |
| 2013/0047230 | A1* | 2/2013 | Krishnan | G06F 21/6218 |
| | | | | 726/7 |
| 2013/0091547 | A1* | 4/2013 | Venkatesh | G06F 7/00 |
| | | | | 726/4 |
| 2014/0075501 | A1* | 3/2014 | Srinivasan | H04L 63/08 |
| | | | | 726/1 |
| 2014/0075565 | A1* | 3/2014 | Srinivasan | H04L 63/10 |
| | | | | 726/26 |
| 2014/0108483 | A1* | 4/2014 | Tarta | G06F 9/5072 |
| | | | | 709/201 |
| 2016/0294881 | A1* | 10/2016 | Hua | H04L 63/20 |
| 2017/0331813 | A1* | 11/2017 | Lander | H04L 63/0815 |
| 2018/0025152 | A1* | 1/2018 | Ben Ali | G06F 21/6281 |
| | | | | 726/22 |
| 2021/0377277 | A1* | 12/2021 | Soneda | H04L 63/104 |
| 2022/0247755 | A1* | 8/2022 | Guest | H04L 63/104 |

OTHER PUBLICATIONS

Azeez, Afkham, et al. "Multi-tenant SOA middleware for cloud computing." 2010 IEEE 3rd international conference on cloud computing. IEEE, 2010. (Year: 2010).*

* cited by examiner

SYSTEMS, METHODS, AND APPARATUSES FOR PRE-CONFIGURED PER-TENANT ISOLATION IN A MULTI-TENANT CLOUD BASED COMPUTING ENVIRONMENT

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments disclosed herein relate generally to the field of computing, and more particularly, to systems, methods, and apparatuses for pre-configured per-tenant isolation in a multi-tenant cloud based computing environment such as a database system implementation supported by a processor and a memory to execute such functionality. Such means may be implemented within the computing architecture of a hosted computing environment, such as an on-demand or cloud-computing environment that utilizes multi-tenant database technologies, client-server technologies, traditional database technologies, or other computing architecture in support of the hosted computing environment.

BACKGROUND

The subject matter discussed in this background section should not necessarily be construed as prior art merely because of its mention in this section. Similarly, a problem mentioned in this section or associated with the subject matter of this section should not be construed as being previously recognized in the prior art. The subject matter in this section merely represents different approaches, which in and of themselves may also correspond to claimed embodiments.

Certain tenants in a multi-tenant database environment may desire isolation features including restrictions on their outbound data and preventing users from linking to other remote services. Prior art multi-tenant database systems involve a large set of conditional isolation requirements in software code applied to all tenants desiring isolation features at the environmental level such as at the platform or application level.

Problematically, blanket condition parameters at the environmental level can be ineffective and cumbersome as well as difficult to test for functionality. Also, the scale of applying isolation at such a high level is daunting. For example, outbound requests may still be attempted and fail, or the user interface may show still show the features that are under isolation requirements, even though the features are disabled. Fixing these isolation features at the end-user stage of deployment can be very costly and time-consuming for customer organizations.

What is needed is a way to apply isolation requirements on a per-tenant basis while maintaining identical code throughout various platform software versions, in the form of a unique version of platform software to allow developers to test the isolation requirements from the view of the end-user before the version is finalized to prevent failed outbound requests and isolated features being shown to the end-user.

Thus, tenants with varying levels of isolation restrictions may share the same multi-tenant computing environment and the present state of the art may benefit from systems, methods, and apparatuses for implementing pre-configured pre-tenant isolation in a multi-tenant cloud based computing environment.

BRIEF DESCRIPTION OF THE DRAWINGS

Embodiments are illustrated by way of example, and not by way of limitation, and will be more fully understood with reference to the following detailed description when considered in connection with the figures in which.

DETAILED DESCRIPTION

Figure 1:
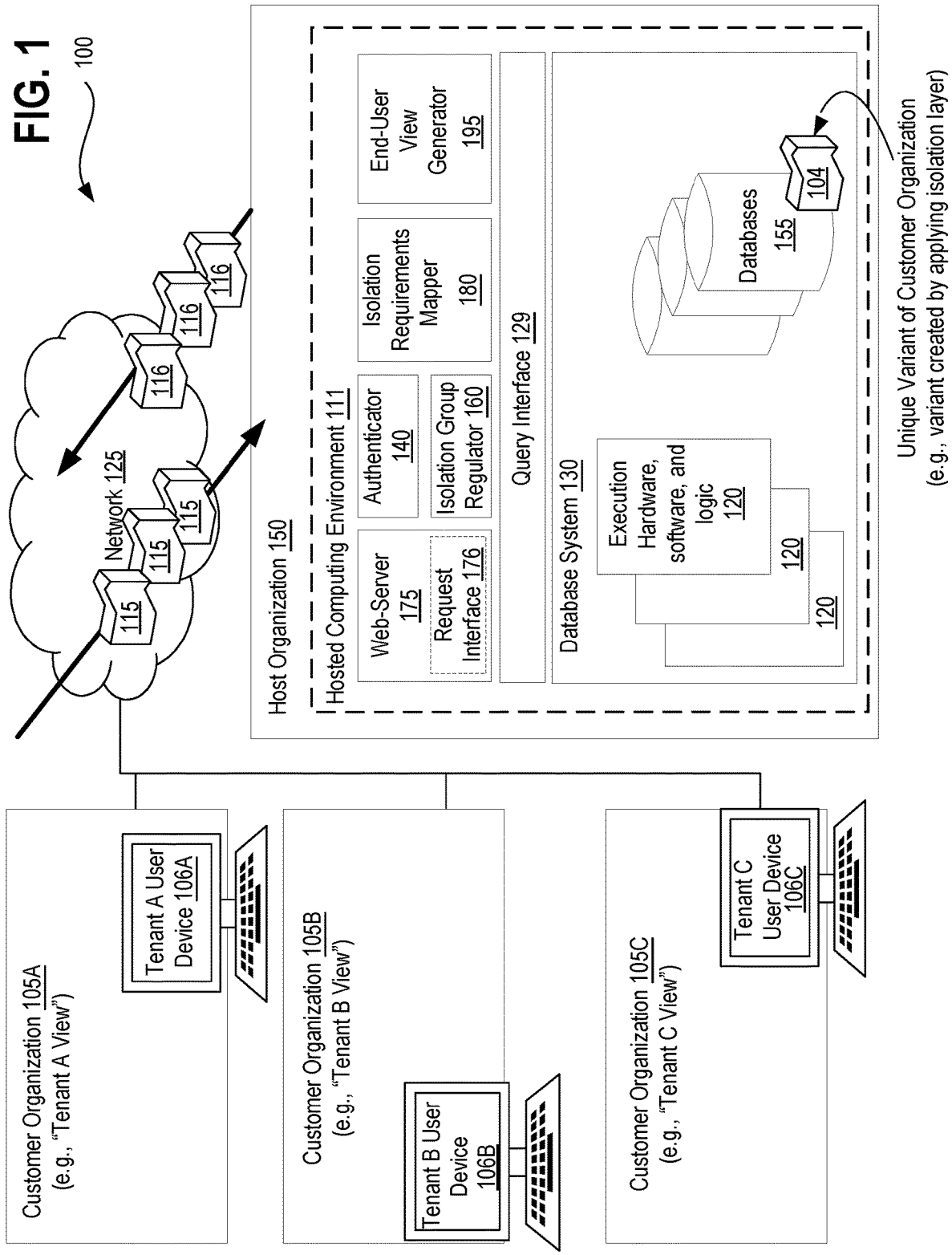
FIG. 1 depicts an exemplary architecture in accordance with described embodiments.

Described herein are systems, methods, and apparatuses for pre-configured per-tenant isolation in a multi-tenant cloud based computing environment. For instance, such an exemplary system having a processor and a memory therein includes means for creating an isolation group, in which creating the isolation groups includes: defining isolation requirements, identifying a group of features utilizing call-out functions, and selecting from among the group of features utilizing call-out functions a group of features having the defined isolation requirements; deploying platform software integrating the isolation requirements, in which the platform software contains instructions to map the isolation requirements to a customer organization; creating the customer organization; creating a unique variant of the customer organization, in which creating the unique variant of the customer organization includes declaratively applying an isolation layer containing isolation requirements on top of a base layer for the customer organization; and deploying the unique variant of the customer organization onto the customer organization's computing infrastructure, in which the unique variant validates per-tenant distinctions for various applications subjected to the isolation requirements.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well-known materials or methods are described in detail in order to avoid unnecessarily obscuring the disclosed embodiments.

In addition to various hardware components depicted in the figures and described herein, embodiments further include various operations that are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated, configured, or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems appears as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other programmable electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

Certain tenants operating in a multi-tenant environment may desire isolation features. For example, the US government may restrict outbound connections and linking to remote services such as LinkedIn from within its computing environment. Other tenants, such as cloud computing environments with servers in China may have regulations banning the transmission of data to outside the physical borders of that country, enforced for example, through network restrictions and firewalls. Yet other tenants may desire that end-users experience the same isolation requirements independent of the end-users location.

A unique version of an organization with isolation features applied, for example via overlay of an isolation layer, may be known as a scratch organization or an isolation edition. The isolation features are settings built into existing code and may be toggled on or off. According to certain embodiments, features may be isolated by default, and tenants of customer organization may opt in for features that they do not wish to be isolated during the setup of permissions when a customer organization is provisioned. A master list of all the permission driving isolation may also be kept. In this way, the isolation layer is applied only once, avoiding the problems inherent with many conditional parameters being continuously applied. This scratch organization does not impact the base version of the customer organization, making it ideal for developers to use at the development stage of a program for previewing isolation features as an end-user would see them (i.e. the end-user's view of "flattened" or unavailable features to which isolation requirements have been applied). This ability to toggle between isolation features being applied or not affords developers a chance for insight into the program. Insights gained may be used to experiment and improve upon the isolation features in a test environment before a more developed version of the program is deployed to end-users and other parties. Catching and fixing errors in the scratch organization environment is much less costly and burdensome for a customer organization than attempting to do the same in further version of the programs such as testing versions and end-user deployed versions.

The ability to operate a scratch organization also allows for standardization in training and customer support, for example the ability to capture screenshots with isolation features applied as the end-user would see them, as opposed to a developer's view which may look very different from the version deployed to end-users.

Furthermore, in situations where the tenant environment is in another physical location than the developer, for example, a developer in the United States working on a program to be deployed in China, the developer may support the physical isolation requirements of China for its programs and tenants from outside of that environment.

Thus, through application of isolation requirements on a per-tenant basis, tenants with and without isolation requirements applied may share the same multi-tenant computing environment.

FIG. 1 depicts an exemplary architecture 100 in accordance with described embodiments. In one embodiment, a host organization 101 is communicably interfaced with a plurality of tenant user devices 106A-C (e.g., such as mobile devices, smart phones, tablets, PCs, etc.) through network 125. In one embodiment, a database system 130 includes databases 155, for example, to store application code, object data, tables, datasets, and underlying database records with user data on behalf of isolation application platform participants 105A-C (e.g., a group of users of such a database system 130, or tenants of a multi-tenant database type database system or the affiliated users of such a database system). Such databases include various database system types including, for example, a relational database system and a non-relational database system according to certain embodiments.

Certain embodiments may utilize a client-server computing architecture to supplement features, functionality, or computing resources for the database system 130 or alternatively, a computing grid, or a pool of work servers, or some combination of hosted computing architectures may be utilized to carry out the computational workload and processing demanded of the hosted computing environment 111 in conjunction with the database system 130.

The database system 130 depicted in the embodiment shown includes a plurality of underlying hardware, software, and logic elements 120 that implement database functionality and a code execution environment within the hosted computing environment 111.

In accordance with one embodiment, database system 130 utilizes underlying database system implementations to service database queries and other data interactions with the database system 130 which communicate with the database system 130 via the query interface 129. The hardware, software, and logic elements 120 of the database system 130 are separate and distinct from a plurality of tenants, i.e., customer organizations (105A, 105B, and 105C) which utilize web services and other service offerings as provided by the host organization 150 by communicably interfacing to host organization 150 via network 125. In such a way, isolation host organization 150 may implement on-demand services, on-demand database services or cloud computing services to subscribing customer organizations 105A-C.

Further depicted is the host organization 150 receiving input and other requests 115 from a plurality of customer organizations 105A-C via network 125 (such as a public Internet). For example, incoming search queries, database queries, API requests, interactions with displayed graphical user interfaces and displays at the tenant user devices 106A-C, or other inputs may be received from the customer organizations 105A-C to be processed against the database system 130, or such queries may be constructed from the inputs and other requests 115 for execution against the databases 155 or the query interface 129, pursuant to which results 116 are then returned to an originator or requestor, such as a user of one of a tenant user device 106A-C at a customer organization 105A-C.

In one embodiment, each customer organization 105A-C is an entity selected from the group consisting of: a group of users, a separate and distinct remote organization, an organizational group within the host organization 150, a business partner of the host organization 150, or a customer organization 105A-C that subscribes to cloud computing services provided by the host organization 150.

In one embodiment, requests 115 are received at, or submitted to, a web-server 175 within host organization 150. Host organization 150 may receive a variety of requests for processing by the host organization 150 and its database system 130. Incoming requests 115 received at web-server 175 may specify which services from the host organization 150 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 115 from various customer organizations 105A-C via network 125 on behalf of the query interface 129 and for providing a web-based interface or other graphical displays to an end-user client device (tenant user device) 106A-C or machine originating such data requests 115.

The query interface 129 is capable of receiving and executing requested queries against the databases and storage components of the database system 130, return a result set, response (such as applying an isolation layer to a base layer for a customer organization), or other requested data in furtherance of the methodologies described. The query interface 129 additionally provides functionality to pass queries from web-server 175 into the database system 130 for execution against the databases 155 for processing search queries, or into the other available data stores of the hosted computing environment 111. In one embodiment, the query interface 129 implements an Application Programming Interface (API) through which queries may be executed against the databases 155 or the other data stores.

Host organization 150 may implement a request interface 176 via web-server 175 or as a stand-alone interface to receive requests packets or other requests 115 from the tenant user devices 106A-C. Request interface 176 further supports the return of response packets or other replies and responses 116 in an outgoing direction from host organization 150 to the tenant user devices 106A-C.

Authenticator 140 operates on behalf of the host organization 150 to verify, authenticate, and otherwise credential users attempting to gain access to the host organization 150.

Isolation requirements mapper 180 maps an isolation layer containing an isolation group of features to a customer organization desiring isolation, for example to the base layer for a customer organization, in order to generate a unique variant of the customer organization which may be deployed 104 to database system 130.

Isolation group regulator 160 defines an isolation group features, for example, by flagging features corresponding with isolation requirements from among a group of features with call-out functions, which according to certain embodiments may involve a master list of all features with call-out functions (Source Control).

End-user view generator 195 allows for previewing of the views seen at tenant user devices 106A-106C, for example, for product development and testing before transmission of data 116 to tenant user devices 106A-106C at customer organizations 105A-105C.

Figure 2:
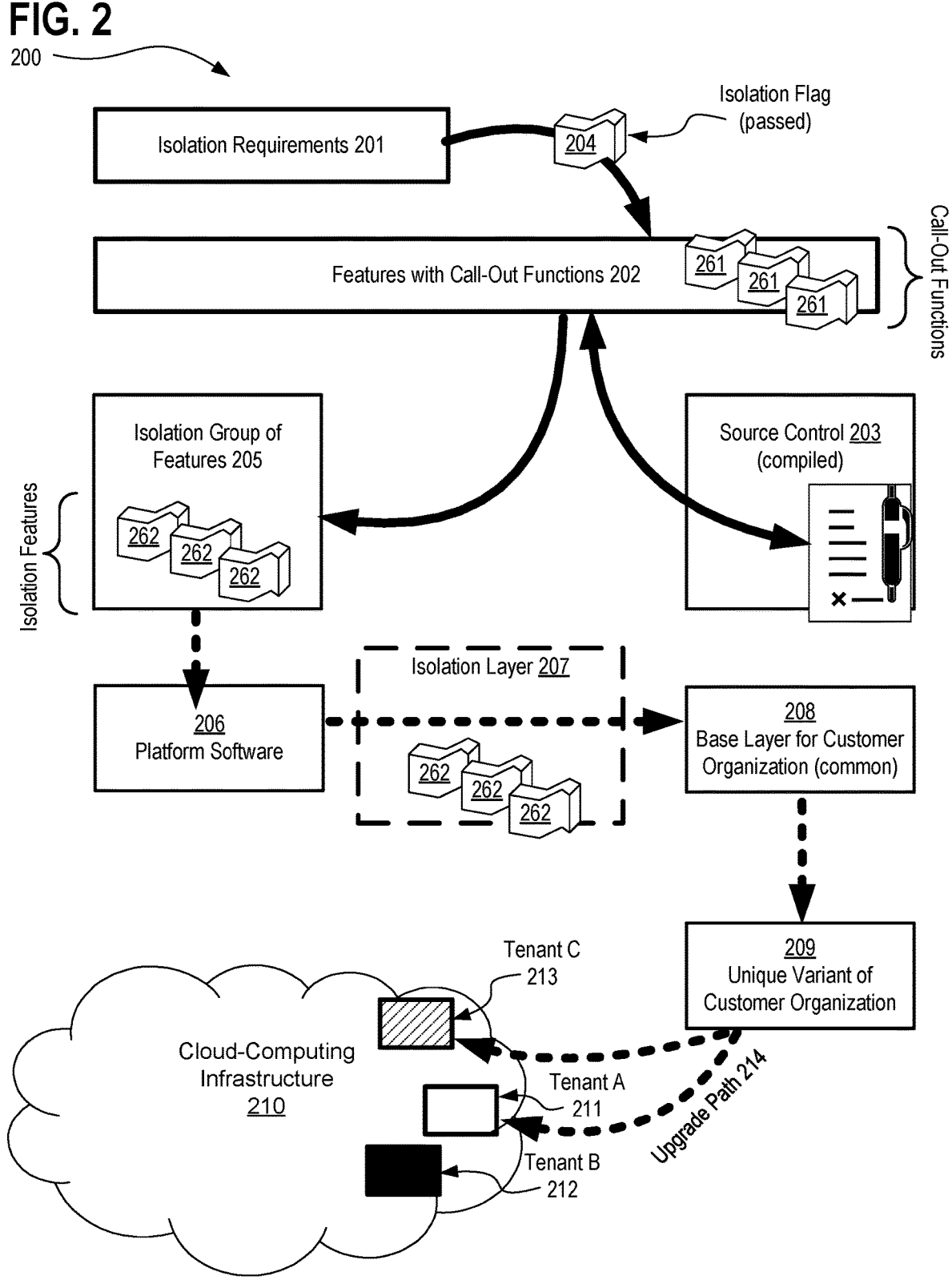
FIG. 2 depicts an exemplary architecture illustrating data flows and operations for applying pre-configured per-tenant isolation within a cloud based computing environment in accordance with disclosed embodiments.

FIG. 2 depicts an exemplary architecture 200 illustrating data flows and operations for applying pre-configured per-tenant isolation within a cloud based computing environment in accordance with disclosed embodiments.

In one embodiment, the process of pre-configured per-tenant isolation begins with defining desired isolation requirements 201. Isolation requirements 201 may be defined as, for example, restricting end-user ability to see and access icons for remote organizations such as LinkedIn from within a customer organization's cloud computing infrastructure 210.

Next, a group of features with call-out functions 261 is compiled to generate a group of features having the call-out functions (see element 202) which is ready to be provisioned into a unique variant codebase for a customer organization.

According to certain embodiments, the call-out functions may take the form of a list, also known as Source Control 203. Source Control 203 may also contain other lists, for example, a master list of all permissions driving the isolation and isolation requirements 201.

Isolation requirements 201 are applied to the group of features with call-out functions 202 by flagging 204 features within the features with call-out functions 202 that isolation requirements 201 can be applied to on the basis of, for instance, having compatible operations or having compatible source code capable of accommodating the call-out function within a specified function or application. This process generates an isolation group 205. Isolation group 205 is thus a group of features having isolation requirements 201 represented therein which is ready to perform call-out functions. According to certain embodiments, isolation group 205 may be represented by an isolation.yaml file, a variation of JavaScript Object Notation (JSON), commonly used for transmitting data in web applications.

Next, isolation group 205 is integrated into the source code of platform software 206 so as to incorporate the various isolation features 262 into the platform software 206 which is then capable of applying the isolation requirements 201 to a customer organization or tenant by provisioning the isolation requirements 201 as part of a unique customer organization's variant (e.g., the specific codebase unique to that customer organization). This is accomplished via platform software 206 applying an isolation layer 207 with the variously defined isolation features on top of a common base layer for the customer organization 208, so as to create a unique variant of the customer organization 209, also known as an "isolation edition."

The unique variant of customer organization 209 is then deployed to a customer organization, also known as Tenant A 211, at cloud computing infrastructure 210. Thus, deploying platform software 206 to create a unique variant of customer organization 209 may be done via declarative programming, i.e. before a customer organization ("tenant") is created. Thus, the platform software 206 may apply the isolation requirements 201 via the isolation layer 207 after a customer organization such as Tenant A 111 is created. In other words, platform software 206 does not need to be re-deployed each time a customer organization desires that isolation requirements 201 be applied to them.

Existing customer organizations such as Tenant C 213 desiring isolation requirements 201 to be applied to them may upgrade to unique variant of customer organization 209 via an upgrade path 214.

Thus, within cloud-computing infrastructure 210, there is a multi-tenant environment in which isolation requirements 201 are applied to certain tenants desiring isolation such as a new tenant, Tenant A 211, and an existing tenant, Tenant B 212. Thus, such tenants may cohabitate cloud-computing infrastructure 210 along with other tenant(s) such as Tenant C 213 that have no isolation requirements 201 applied to them. Tenants that choose to have isolation requirements 201 applied to them, for example Tenant A 211 and Tenant B 112, may also have different levels or types of isolation applied to them, as determined by their permissions. Thus, tenants with differing or the same isolation requirements 201 applied to them may also cohabitate cloud-computing infrastructure 210.

As a result, isolation is driven on a per-tenant basis instead of blanket parameters for one isolation environment. For example, pseudo code that applies blanket parameters for isolation may perform the following function:

```
if(Environment.isIsolated( ) )
{
    dontShowLink( ) ;
} else {
    showLink( );
}
```

In contrast, per-tenant isolation pseudo code drives isolation on a per-tenant basis while still using the same pseudo code across different versions of a program. For example:

```
if(Tenant.shouldShowLinkedIn( ) )
{
    showLink( ) ;
} else {
    dontShowLink( ) ;
}
```

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

Figure 3:
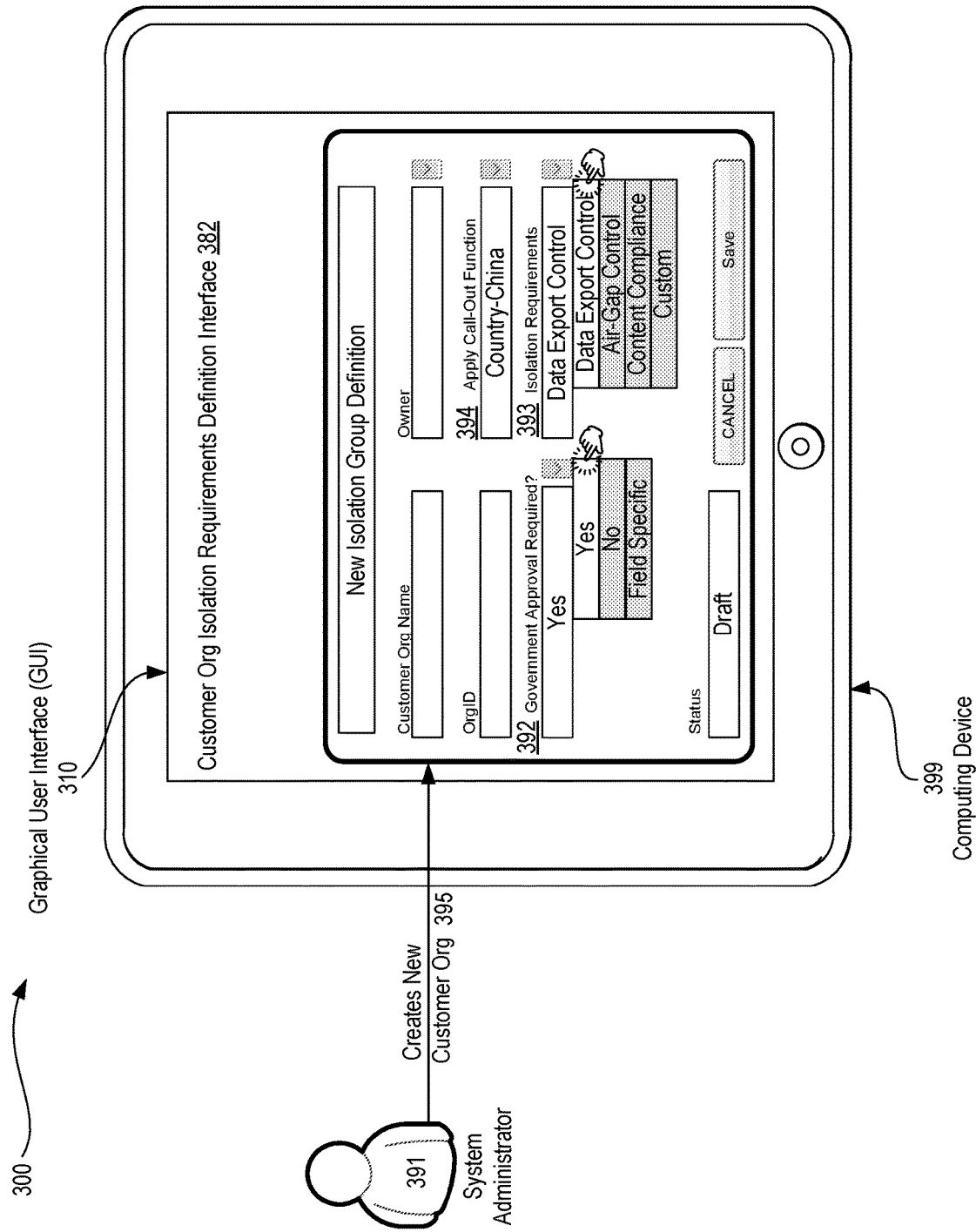
FIG. 3 depicts another exemplary architecture in accordance with described embodiments.

FIG. 3 depicts another exemplary architecture 300 in accordance with described embodiments.

As shown here, there is a GUI 310 executing at a computing device 399, such as a user device of the system administrator, with the GUI 310 being pushed to the computing device 300 by the isolation requirements mapper 180 of the host organization 110 (see FIG. 1).

As shown here, the system administrator 391 may create a new customer organization 395 and view the isolation group or a system administrator 391 may alternatively load an existing customer organization and view the existing isolation group via the GUI 310 within the Customer Org Isolation requirements definition interface 382.

As shown here, via GUI 310, the administrator has selected isolation requirements 393 to be applied to the customer organization, for instance, shown here selecting Data Export Control. Other isolation requirements may be applied, such as air-gap network controls, content compliance controls, or custom defined and configured controls. Further depicted is the ability to specify which call-out function or functions are to be applied 394. As shown, a per-country or country specific call-out function is selected. Still further depicted is the ability to indicate whether or not government approval is required 392, for instance, such as whether or not it is permissible to alter the settings or whether or not application or removal of isolation requirements requires governmental approval or if merely self-regulated compliance is sufficient.

According to a particular embodiment, displaying the GUI interface to the user device is achieved by executing instructions stored in the memory of a system via the processor, in which the instructions cause the system to transmit the GUI interface from a receive interface of the system to a user device communicably interfaced with the system over the network. Further operations may include receiving the input at the system from the GUI interface.

Once the input is received by the host organization or at the platform, it may be persistently stored via the multi-tenant database system for later reference and retrieval.

According to a particular embodiment, a system of the host organization implements a cloud computing platform providing on-demand cloud computing services on accessible to subscribers of the cloud computing platform and each of the customer organizations for which a unique variant (e.g., a unique codebase having the relevant isolation requirements encoded therein) corresponds to one of a plurality of customer organizations having subscriber access to the on-demand cloud computing services provided by the cloud computing platform.

Figure 4:
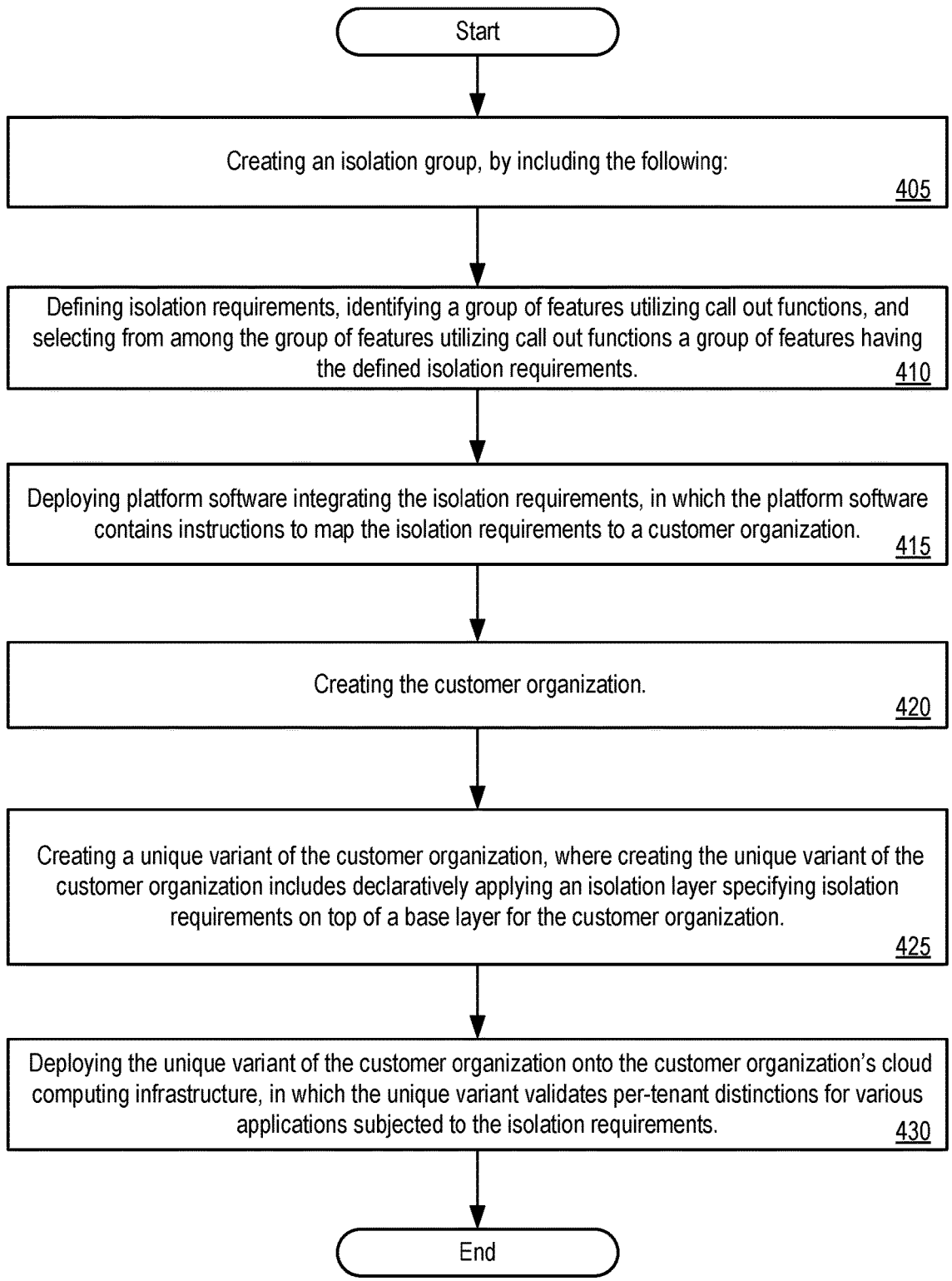
FIG. 4 depicts a flow diagram illustrating a method for implementing pre-configured pre-tenant isolation in a multi-tenant cloud based computing environment in accordance with described embodiments.

FIG. 4 depicts a flow diagram illustrating a method 400 for implementing pre-configured pre-tenant isolation in a multi-tenant cloud based computing environment such as a database system implementation supported by a processor and a memory to execute such functionality to provide cloud based on-demand functionality to users, customers, and subscribers.

Method 400 may be performed by processing logic that may include hardware (e.g., circuitry, dedicated logic, programmable logic, microcode, etc.), software (e.g., instructions run on a processing device) to perform various operations such as operating, defining, declaring, associating, writing, receiving, retrieving, adding, transacting, training, distributing, processing, transmitting, analyzing, triggering, pushing, recommending, parsing, persisting, exposing, loading, generating, storing, maintaining, creating, returning, presenting, interfacing, communicating, querying, providing, determining, displaying, updating, sending, etc., in pursuance of the systems and methods as described herein. For example, the hosted computing environment 111, the isolation requirements mapped 180, and its database system 130 as depicted at FIG. 1, et seq., and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 400 depicted at FIG. 4, the method begins at block 405, where processing logic creates an isolation group. According to such an embodiment, the creation of an isolation group includes the following:

At block 410, processing logic defines isolation requirements, identifying a group of features utilizing call-out functions, and selecting from among the group of features utilizing call-out functions a group of features having the defined isolation requirements.

At block 415, processing logic deploys platform software integrating the isolation requirements, wherein the platform software contains instructions to map the isolation requirements to a customer organization.

At block 420, processing logic creates the customer organization.

At block 425, processing logic creates a unique variant of the customer organization, where creating the unique variant of the customer organization includes declaratively applying an isolation layer specifying isolation requirements on top of a base layer for the customer organization.

At block 430, processing logic deploys the unique variant of the customer organization onto the customer organization's cloud computing infrastructure, wherein the unique variant validates per-tenant distinctions for various applications subjected to the isolation requirements.

According to another embodiment, method 400 further includes: receiving a request at the platform to apply an optionally specified tagging isolation feature; and in which the tagging isolation feature, when applied, forces the platform to trigger a call-out function for review and possible inclusion within a call-out isolation group.

According to another embodiment of method 400, the platform to trigger a call-out function for review and possible inclusion includes the platform automatically sending a message to a development group or systems administrator group for the platform with a request to review the call-out function for review and to make a determination whether or not to include the call-out function as a new isolation feature for one or more customer organizations utilizing the platform by configuring the respective unique variant for the one or more customer organizations to have the new isolation feature.

According to another embodiment, method 400 further includes: defining the isolation requirements to associate each customer organization with multiple different and distinct unique variants on a per-country basis; in which each of the multiple different and distinct unique variants include the defined isolation requirements as specified on the per-country basis; and in which the defined isolation requirements for the isolation group are determined and applied for each customer organization on the basis of data being transmitted into a country or jurisdiction from the platform or on the basis of data being received at the platform from a country or jurisdiction corresponding to the per-country defined one of the multiple different and distinct unique variants.

According to another embodiment, method 400 further includes: testing the call-out functions by simulating interactions with the platform utilizing the customer organization created to generate simulated output in compliance with the defined isolation requirements for the customer organization created; validating the call-out functions by comparing the simulated output with the defined isolation requirements; and returning a testing result by sending a message to a development group or systems administrator group for the platform with the testing result and with the simulated output.

According to another embodiment, method 400 further includes: validating all call-out functions defined for a customer organization pursuant to the isolation requirements are referenceable and correspond to one or more defined mappings to the isolation group created; and validating the platform software to be deployed includes source code declaratively linking each available isolation group with a corresponding isolation group definition specifying the group of features utilizing the call-out functions.

According to another embodiment, method 400 further includes: creating a new customer organization and specifying the isolation layer for the new customer organization; and inheriting the defined isolation requirements into the new customer organization created to create the unique variant of the customer organization while maintaining an existing upgrade path for the customer organization within the unique variant created.

According to another embodiment of method 400, deploying the unique variant of the customer organization onto the customer organization's cloud computing infrastructure, includes: provisioning the unique variant of the customer organization with functionality specific to the unique variant of the customer organization by incorporating into the unique variant of the customer organization all applications associated with the customer organization with the defined isolation requirements layered on top of the applications incorporated into the unique variant of the customer organization; in which deployment of each application incorporated into the unique variant of the customer organization is multi-tenant aware due to being uniquely tied to the unique variant of the customer organization; in which a first instance of a common application provisioned for a first customer organization co-exists within a compute pod with a second instance of the common application provisioned for a second customer organization within the compute pod, in which the first and the second instance of the common application share an identical base source code via the common application; and in which the first instance and the second instance of the common application operate distinctly within the compute pod on behalf of each of the first and the second customer organizations due to distinct isolation requirements defined for each of the first and the second customer organizations and applied to the identical base source code at the time of provisioning for each of the first and the second customer organization.

According to another embodiment of method 400, the customer organization is an existing customer organization, in which creating the unique variant of the customer organization involves an upgrade path to apply the isolation layer.

According to another embodiment of method 400, the cloud computing infrastructure is a multi-tenant organization environment, in which deploying the unique variant of the customer organization discriminates on a per-tenant basis based on the isolation requirements applied to the unique variant of the customer organization.

According to another embodiment of method 400, the isolation group is created based on an isolation.yaml file; and in which a plurality of isolation groups are created and deployed to the platform software utilizing the isolation.yaml file.

According to another embodiment of method 400, the isolation requirements are validated with the customer organization and its unique variant before deploying the unique variant of the customer organization onto the customer organization's cloud computing infrastructure.

According to another embodiment of method 400, declaratively applying the isolation layer specifying isolation requirements on top of a base layer for the customer organization includes: configuring the unique variant of the customer organization to operate within an air-gap network at the request of that customer organization; and in which the customer organization's cloud computing infrastructure air-gap network is not communicably interfaced with any other customer organization's computing infrastructure utilizing the platform via either wired or wireless communication interfaces.

According to another embodiment of method 400, declaratively applying the isolation layer specifying isolation requirements on top of a base layer for the customer organization includes: configuring the unique variant of the customer organization to transmit all data being transmitted to a different country or jurisdiction from that within which the platform operates through a data export filter prior to transmission to the different country or jurisdiction.

According to another embodiment of method 400, the data export filter operates in accordance with data export regulations as specified by the country or jurisdiction within which the platform operates.

According to another embodiment of method 400, a workflow governance is produced that specifies all changes between the customer organization and its unique variant based on the isolation requirements.

According to another embodiment of method 400, the system implements a cloud computing platform to provide on-demand cloud based computing services to subscribers of the cloud computing platform; and in which end users of the cloud computing platform are each associated with one of the plurality of customer organizations having subscriber access to the on-demand cloud based computing services provided by the cloud computing platform.

In accordance with a particular embodiment, there is a non-transitory computer-readable storage medium having instructions stored thereupon that, when executed by a processor of a system having at least a processor and a memory therein, the instructions cause the system to perform operations including: creating an isolation group, in which creating the isolation group includes: defining isolation requirements, identifying a group of features utilizing call-out functions, and selecting from among the group of features utilizing call-out functions a group of features having the defined isolation requirements; deploying platform software integrating the isolation requirements, in which the platform software contains instructions to map the isolation requirements to a customer organization; creating the customer organization; creating a unique variant of the customer organization, in which creating the unique variant of the customer organization includes declaratively applying an isolation layer specifying isolation requirements on top of a base layer for the customer organization; and deploying the unique variant of the customer organization onto the customer organization's cloud computing infrastructure, in which the unique variant validates per-tenant distinctions for various applications subjected to the isolation requirements.

Figure 5:
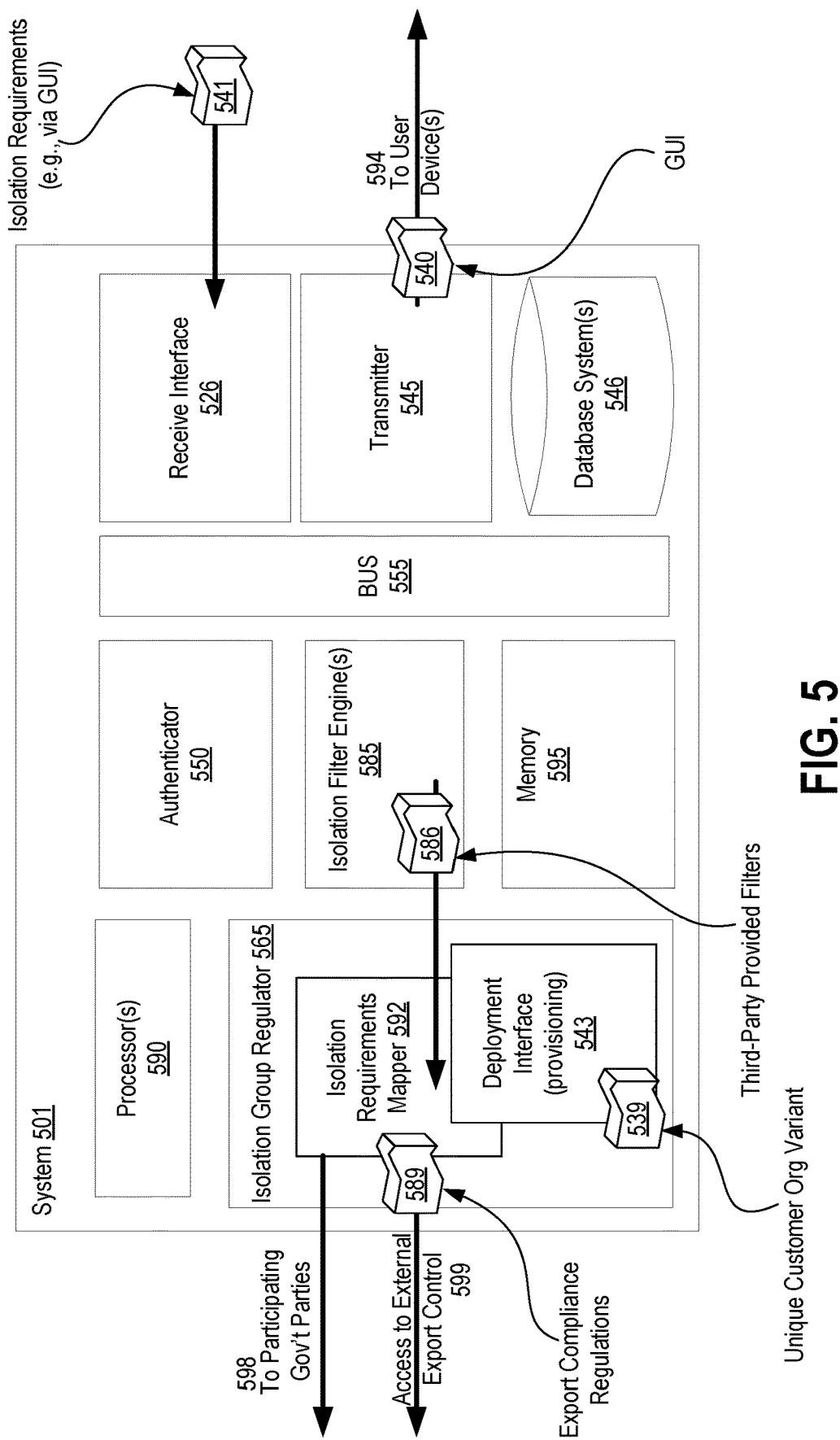
FIG. 5 shows a diagrammatic representation of a system within which embodiments may operate, be installed, integrated, or configured in accordance with described embodiments.

FIG. 5 shows a diagrammatic representation of a system 501 within which embodiments may operate, be installed, integrated, or configured. In accordance with one embodiment, there is a system 501 having at least a processor 590 and a memory 595 therein to execute implementing application code for the methodologies as described herein. Such a system 501 may communicatively interface with and cooperatively execute with the benefit of a hosted computing environment, such as a host organization, a multi-tenant environment, an on-demand service provider, a cloud based service provider, a client-server environment, etc.

According to the depicted embodiment, system 501, which may operate within a host organization, includes the processor 590 and the memory 595 to execute instructions at the system 501. According to such an embodiment, system 501 further includes a non-transitory machine-readable storage medium that provides instructions that, when executed by the set of one or more processors 590, the instructions stored in the memory 595 are configurable to cause the system 501 to perform operations including: creating an isolation group (e.g., on the basis of isolation requirements 541 received via the GUI 540 or on the basis of export compliance regulations 589 provided by the access to the external export control 599 entities, or on the basis of the third party provided filters 586, etc.). According to such an embodiment, creating the isolation group includes: defining isolation requirements 541, identifying a group of features utilizing call-out functions, and selecting from among the group of features utilizing call-out functions a group of features having the defined isolation requirements; deploying platform software integrating the isolation requirements, for instance, with the deployment or provisioning being done via the deployment interface 543. With such an embodiment, the platform software contains instructions to map the isolation requirements to a customer organization and the system 501 then creates the customer organization, pursuant to which application of the isolation requirements enables the creation of the unique variant 539 of the customer organization, and further in which creating the unique variant of the customer organization includes declaratively applying an isolation layer specifying isolation requirements 541 on top of a base layer for the customer organization. Still further, the system 501 deploys the unique variant 539 of the customer organization onto the customer organization's cloud computing infrastructure, in which the unique variant validates per-tenant distinctions for various applications subjected to the isolation requirements.

A receive interface 526 of the system 501 is to receive the isolation requirements 541 according to certain embodiments.

Bus 555 interfaces the various components of the system 501 amongst each other, with any other peripheral(s) of the system 501, and with external components such as external network elements, other machines, client devices, cloud computing services, etc. Communications may further include communicating with external devices via a network interface over a LAN, WAN, or the public Internet. Authenticator 550 provides authentication services for users seeking access to the database systems 546, clouds, and other services of the host organization.

Figure 6:
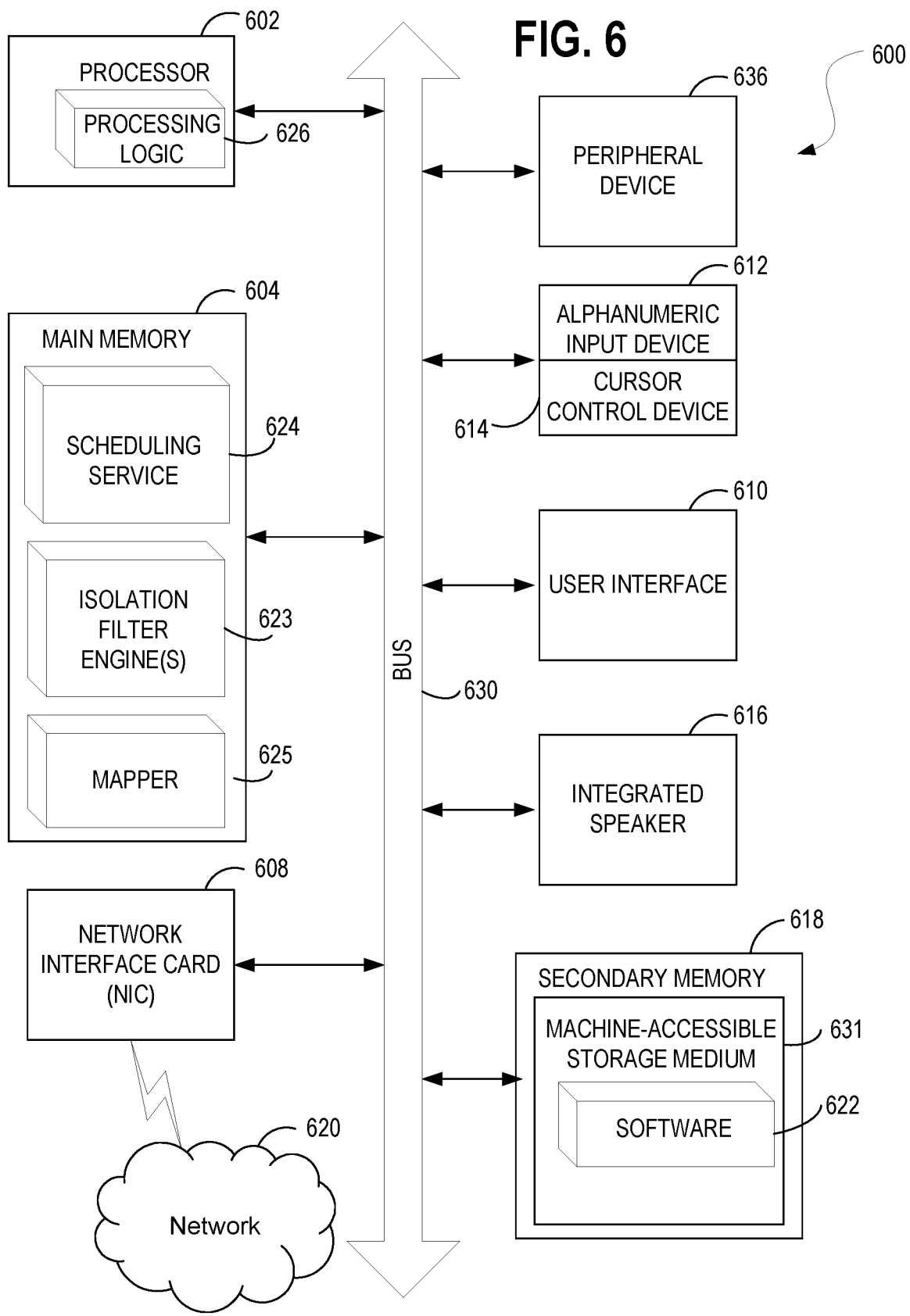
FIG. 6 illustrates a diagrammatic representation of a machine in the exemplary form of a computer system, in accordance with one embodiment.

FIG. 6 illustrates a diagrammatic representation of a machine 600 in the exemplary form of a computer system, in accordance with one embodiment, within which a set of instructions, for causing the machine/computer system 600 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 618 (e.g., a persistent storage device including hard disk drives and a persistent database and/or a multi-tenant database implementation), which communicate with each other via a bus 630. Main memory 604 includes a scheduling service 624 and a mapper 625 and isolation filter engine(s) 623 by which to communicate with customer organizations desiring isolation, including retrieving and applying an isolation layer to create a unique variant of the customer organization, in accordance with described embodiments. Main memory 604 and its sub-elements are operable in conjunction with processing logic 626 and processor 602 to perform the methodologies discussed herein. Main memory 604 and its sub-elements are operable in conjunction with processing logic 626 and processor 602 to perform the methodologies discussed herein.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the processing logic 626 for performing the operations and functionality which is discussed herein.

The computer system 600 may further include a network interface card 608. The computer system 600 also may include a user interface 610 (such as a video display unit, a liquid crystal display, etc.), an alphanumeric input device 612 (e.g., a keyboard), a cursor control device 614 (e.g., a mouse), and a signal generation device 616 (e.g., an integrated speaker). The computer system 600 may further include peripheral device 636 (e.g., wireless or wired communication devices, memory devices, storage devices, audio processing devices, video processing devices, etc.).

The secondary memory 618 may include a non-transitory machine-readable storage medium or a non-transitory computer readable storage medium or a non-transitory machine-accessible storage medium 631 on which is stored one or more sets of instructions (e.g., software 622) embodying any one or more of the methodologies or functions described herein. The software 622 may also reside, completely or at least partially, within the main memory 604 and/or within the processor 602 during execution thereof by the computer system 600, the main memory 604 and the processor 602 also constituting machine-readable storage media. The software 622 may further be transmitted or received over a network 620 via the network interface card 608.

Figure 7A:
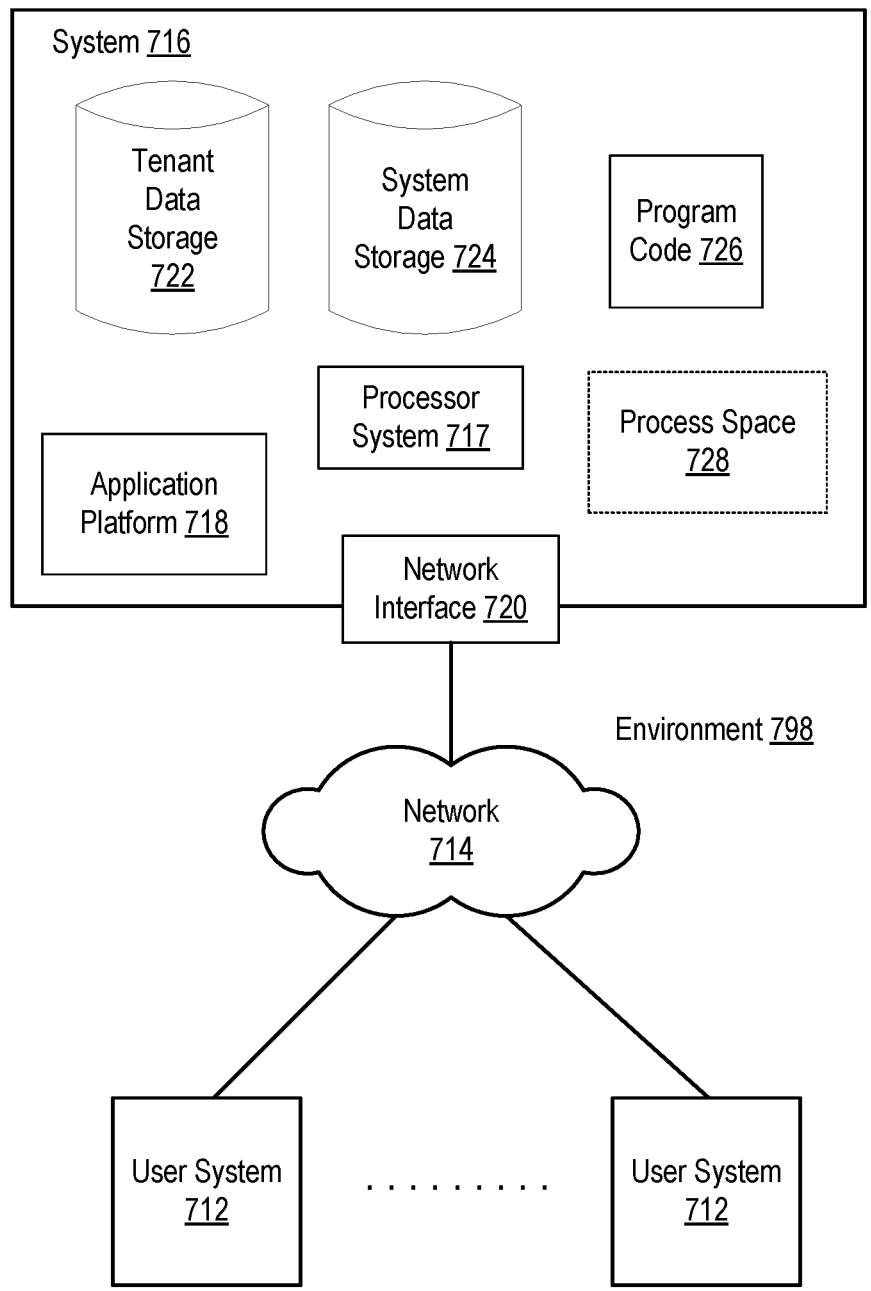
FIG. 7A illustrates a block diagram of an environment in which an on-demand database service may operate in accordance with the described embodiment.

FIG. 7A illustrates a block diagram of an environment 798 in which an on-demand database service may operate in accordance with the described embodiments. Environment 798 may include user systems 712, network 714, system 716, processor system 717, application platform 718, network interface 720, tenant data storage 722, system data storage 724, program code 726, and process space 728. In other embodiments, environment 798 may not have all of the components listed and/or may have other elements instead of, or in addition to, those listed above.

Environment 798 is an environment in which an on-demand database service exists. User system 712 may be any machine or system that is used by a user to access a database user system. For example, any of user systems 712 can be a handheld computing device, a mobile phone, a laptop computer, a work station, and/or a network of computing devices. As illustrated in FIG. 7A (and in more detail in FIG. 7B) user systems 712 might interact via a network 714 with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" is used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 7A, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

One arrangement for elements of system 716 is shown in FIG. 7A, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7A include conventional, well-known elements that are explained only briefly here. For example, each user system 712 may include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application(s) including computer code to run using a central processing unit such as processor system 717, which may include an Intel Pentium® processor or the like, and/or multiple processor units.

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7B:
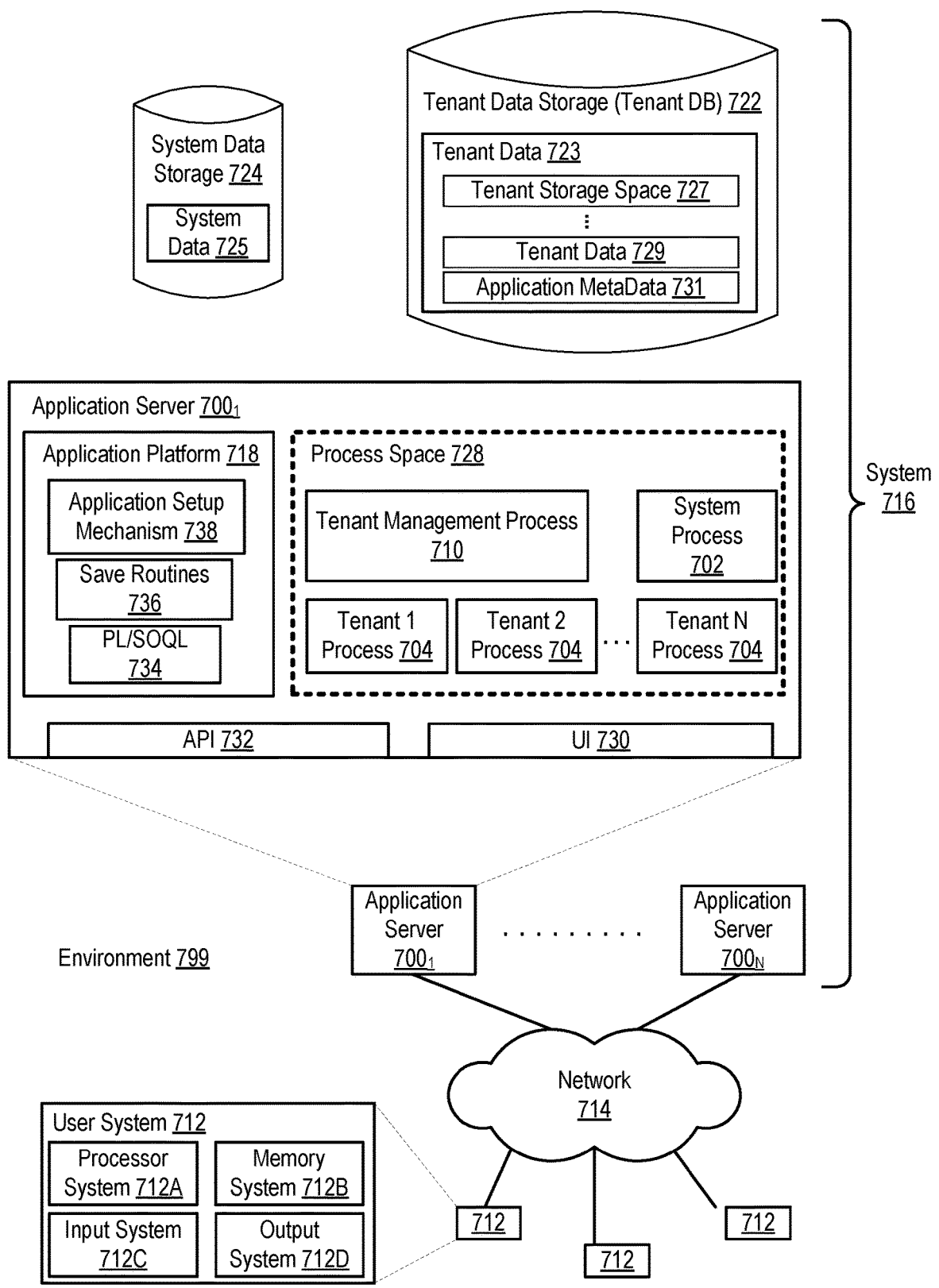
FIG. 7B illustrates another block diagram of an embodiment of elements of FIG. 7A and various possible interconnections between such elements in accordance with the described embodiments.

FIG. 7B illustrates another block diagram of an embodiment of elements of FIG. 7A and various possible interconnections between such elements in accordance with the described embodiments. FIG. 7B also illustrates environment 799. However, in FIG. 7B, the elements of system 716 and various interconnections in an embodiment are illustrated in further detail. More particularly, FIG. 7B shows that user system 712 may include a processor system 712A, memory system 712B, input system 712C, and output system 712D. FIG. 7B shows network 714 and system 716. FIG. 7B also shows that system 716 may include tenant data storage 722, having therein tenant data 723, which includes, for example, tenant storage space 727, tenant data 729, and application metadata 731. System data storage 724 is depicted as having therein system data 725. Further depicted within the expanded detail of application servers 700₁₋ₙ are User Interface (UI) 730, Application Program Interface (API) 732, application platform 718 includes PL/SOQL 734, save routines 736, application setup mechanism 738, process space 728 includes system process space 702, tenant 1-N process spaces 704, and tenant management process space 710. In other embodiments, environment 799 may not have the same elements as those listed above and/or may have other elements instead of, or in addition to, those listed above.

User system 712, network 714, system 716, tenant data storage 722, and system data storage 724 were discussed above in FIG. 7A. As shown by FIG. 7B, system 716 may include a network interface 720 (of FIG. 7A) implemented as a set of HTTP application servers 700, an application platform 718, tenant data storage 722, and system data storage 724. Also shown is system process space 702, including individual tenant process spaces 704 and a tenant management process space 710. Each application server 700 may be configured to tenant data storage 722 and the tenant data 723 therein, and system data storage 724 and the system data 725 therein to serve requests of user systems 712. The tenant data 723 might be divided into individual tenant storage areas (e.g., tenant storage space 727), which can be either a physical arrangement and/or a logical arrangement of data. Within each tenant storage space 727, tenant data 729, and application metadata 731 might be similarly allocated for each user. For example, a copy of a user's most recently used (MRU) items might be stored to tenant data 729. Similarly, a copy of MRU items for an entire organization that is a tenant might be stored to tenant storage space 727. A UI 730 provides a user interface and an API 732 provides an application programmer interface into system 716 resident processes to users and/or developers at user systems 712. The tenant data and the system data may be stored in various databases, such as one or more Oracle™ databases.

Application platform 718 includes an application setup mechanism 738 that supports application developers' creation and management of applications, which may be saved as metadata into tenant data storage 722 by save routines 736 for execution by subscribers as one or more tenant process spaces 704 managed by tenant management process space 710 for example. Invocations to such applications may be coded using PL/SOQL 734 that provides a programming language style interface extension to API 732. Invocations to applications may be detected by one or more system processes, which manages retrieving application metadata 731 for the subscriber making the invocation and executing the metadata as an application in a virtual machine.

Each application server 700 may be communicably coupled to database systems, e.g., having access to system data 725 and tenant data 723, via a different network connection. For example, one application server 700₁ might be coupled via the network 714 (e.g., the Internet), another application server 700ₙ₋₁ might be coupled via a direct network link, and another application server 700ₙ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 712 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user may hit three different application servers 700, and three requests from different users may hit the same application server 700. In this manner, system 716 is multi-tenant, in which system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 700 to request and update system-level and tenant-level data from system 716 that may require sending one or more queries to tenant data storage 722 and/or system data storage 724. System 716 (e.g., an application server 700 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A system to execute at a host organization, wherein the system comprises:
   a memory to store instructions;
   a set of one or more processors;
   a non-transitory machine-readable storage medium that provides instructions that, when executed by the set of one or more processors, the instructions stored in the memory are configurable to cause the system to perform operations comprising:
   creating an isolation group, wherein creating the isolation group includes:
   defining isolation requirements, identifying a group of features utilizing call-out functions, and selecting from among the group of features utilizing call-out functions a group of features having the defined isolation requirements;
   deploying platform software integrating the isolation requirements, wherein the platform software contains instructions to map the isolation requirements to a customer organization;
   creating the customer organization;
   creating a unique variant of the customer organization, wherein creating the unique variant of the customer organization includes declaratively applying an isolation layer specifying isolation requirements on top of a base layer for the customer organization; and
   deploying the unique variant of the customer organization onto the customer organization's cloud computing infrastructure, wherein the unique variant validates per-tenant distinctions for various applications subjected to the isolation requirements.

2. The system of claim 1, wherein the instructions are configurable to cause the system to perform operations further including:
   receiving a request at the platform to apply an optionally specified tagging isolation feature; and
   wherein the tagging isolation feature, when applied, forces the platform to trigger a call-out function for review and possible inclusion within a call-out isolation group.

3. The system of claim 2, wherein the platform to trigger a call-out function for review and possible inclusion comprises the platform automatically sending a message to a development group or systems administrator group for the platform with a request to review the call-out function for review and to make a determination whether or not to include the call-out function as a new isolation feature for one or more customer organizations utilizing the platform by configuring the respective unique variant for the one or more customer organizations to have the new isolation feature.

4. The system of claim 1, wherein creating the isolation group, further comprises:
   defining the isolation requirements to associate each customer organization with multiple different and distinct unique variants on a per-country basis;
   wherein each of the multiple different and distinct unique variants include the defined isolation requirements as specified on the per-country basis; and
   wherein the defined isolation requirements for the isolation group are determined and applied for each customer organization on the basis of data being transmitted into a country or jurisdiction from the platform or on the basis of data being received at the platform from a country or jurisdiction corresponding to the per-country defined one of the multiple different and distinct unique variants.

5. The system of claim 1, wherein the instructions are configurable to cause the system to perform operations further including:
   testing the call-out functions by simulating interactions with the platform utilizing the customer organization created to generate simulated output in compliance with the defined isolation requirements for the customer organization created;
   validating the call-out functions by comparing the simulated output with the defined isolation requirements; and
   returning a testing result by sending a message to a development group or systems administrator group for the platform with the testing result and with the simulated output.

6. The system of claim 1, wherein deploying the platform software further comprises:
   validating all call-out functions defined for a customer organization pursuant to the isolation requirements are referenceable and correspond to one or more defined mappings to the isolation group created; and
   validating the platform software to be deployed includes source code declaratively linking each available isolation group with a corresponding isolation group definition specifying the group of features utilizing the call-out functions.

7. The system of claim 1, wherein creating the customer organization further comprises:
   creating a new customer organization and specifying the isolation layer for the new customer organization; and
   inheriting the defined isolation requirements into the new customer organization created to create the unique variant of the customer organization while maintaining an existing upgrade path for the customer organization within the unique variant created.

8. The system of claim 1, wherein deploying the unique variant of the customer organization onto the customer organization's cloud computing infrastructure, comprises:
   provisioning the unique variant of the customer organization with functionality specific to the unique variant of the customer organization by incorporating into the unique variant of the customer organization all applications associated with the customer organization with the defined isolation requirements layered on top of the applications incorporated into the unique variant of the customer organization;
   wherein deployment of each application incorporated into the unique variant of the customer organization is multi-tenant aware due to being uniquely tied to the unique variant of the customer organization;
   wherein a first instance of a common application provisioned for a first customer organization co-exists within a compute pod with a second instance of the common application provisioned for a second customer organization within the compute pod, wherein the first and the second instance of the common application share an identical base source code via the common application; and
   wherein the first instance and the second instance of the common application operate distinctly within the compute pod on behalf of each of the first and the second customer organizations due to distinct isolation requirements defined for each of the first and the second customer organizations and applied to the identical base source code at the time of provisioning for each of the first and the second customer organization.

9. The system of claim 1:
   wherein the customer organization is an existing customer organization, wherein creating the unique variant of the customer organization involves an upgrade path to apply the isolation layer.

10. The system of claim 1:
    wherein the cloud computing infrastructure is a multi-tenant organization environment, wherein deploying the unique variant of the customer organization discriminates on a per-tenant basis based on the isolation requirements applied to the unique variant of the customer organization.

11. The system of claim 1:
    wherein the isolation group is created based on an isolation.yaml file; and
    wherein a plurality of isolation groups are created and deployed to the platform software utilizing the isolation.yaml file.

12. The system of claim 1:
    wherein the isolation requirements are validated with the customer organization and its unique variant before deploying the unique variant of the customer organization onto the customer organization's cloud computing infrastructure.

13. The system of claim 1, wherein declaratively applying the isolation layer specifying isolation requirements on top of a base layer for the customer organization comprises:
    configuring the unique variant of the customer organization to operate within an air-gap network at the request of that customer organization; and
    wherein the customer organization's cloud computing infrastructure air-gap network is not communicably interfaced with any other customer organization's computing infrastructure utilizing the platform via either wired or wireless communication interfaces.

14. The system of claim 1, wherein declaratively applying the isolation layer specifying isolation requirements on top of a base layer for the customer organization comprises:
configuring the unique variant of the customer organization to transmit all data being transmitted to a different country or jurisdiction from that within which the platform operates through a data export filter prior to transmission to the different country or jurisdiction.

15. The system of claim 14, wherein the data export filter operates in accordance with data export regulations as specified by the country or jurisdiction within which the platform operates.

16. The system of claim 1:
wherein a workflow governance is produced that specifies all changes between the customer organization and its unique variant based on the isolation requirements.

17. The system of claim 1:
wherein the system implements a cloud computing platform to provide on-demand cloud based computing services to subscribers of the cloud computing platform; and
wherein end users of the cloud computing platform are each associated with one of a plurality of customer organizations having subscriber access to the on-demand cloud based computing services provided by the cloud computing platform.

18. A method performed by a system of a host organization, the system having a processor and a memory therein, wherein the method comprises:
creating an isolation group, wherein creating the isolation group includes:
defining isolation requirements, identifying a group of features utilizing call-out functions, and selecting from among the group of features utilizing call-out functions a group of features having the defined isolation requirements;
deploying platform software integrating the isolation requirements, wherein the platform software contains instructions to map the isolation requirements to a customer organization;
creating the customer organization;
creating a unique variant of the customer organization, wherein creating the unique variant of the customer organization includes declaratively applying an isolation layer specifying isolation requirements on top of a base layer for the customer organization; and
deploying the unique variant of the customer organization onto the customer organization's cloud computing infrastructure, wherein the unique variant validates per-tenant distinctions for various applications subjected to the isolation requirements.

19. The method of claim 18, wherein declaratively applying the isolation layer specifying isolation requirements on top of a base layer for the customer organization comprises:
configuring the unique variant of the customer organization to operate within an air-gap network at the request of that customer organization; and
wherein the customer organization's cloud computing infrastructure air-gap network is not communicably interfaced with any other customer organization's computing infrastructure utilizing the platform via either wired or wireless communication interfaces.

20. Non-transitory computer-readable storage media having instructions stored thereupon that, when executed by a processor of a system having at least a processor and a memory therein, the instructions cause the system to perform operations comprising:
creating an isolation group, wherein creating the isolation group includes:
defining isolation requirements, identifying a group of features utilizing call-out functions, and selecting from among the group of features utilizing call-out functions a group of features having the defined isolation requirements;
deploying platform software integrating the isolation requirements, wherein the platform software contains instructions to map the isolation requirements to a customer organization;
creating the customer organization;
creating a unique variant of the customer organization, wherein creating the unique variant of the customer organization includes declaratively applying an isolation layer specifying isolation requirements on top of a base layer for the customer organization; and
deploying the unique variant of the customer organization onto the customer organization's cloud computing infrastructure, wherein the unique variant validates per-tenant distinctions for various applications subjected to the isolation requirements.

21. The non-transitory computer-readable storage media of claim 20, wherein declaratively applying the isolation layer specifying isolation requirements on top of a base layer for the customer organization comprises:
configuring the unique variant of the customer organization to transmit all data being transmitted to a different country or jurisdiction from that within which the platform operates through a data export filter prior to transmission to the different country or jurisdiction.

* * * * *